Oct. 7, 1941.    R. C. NELTNER    2,258,098
CAMERA
Filed April 23, 1941
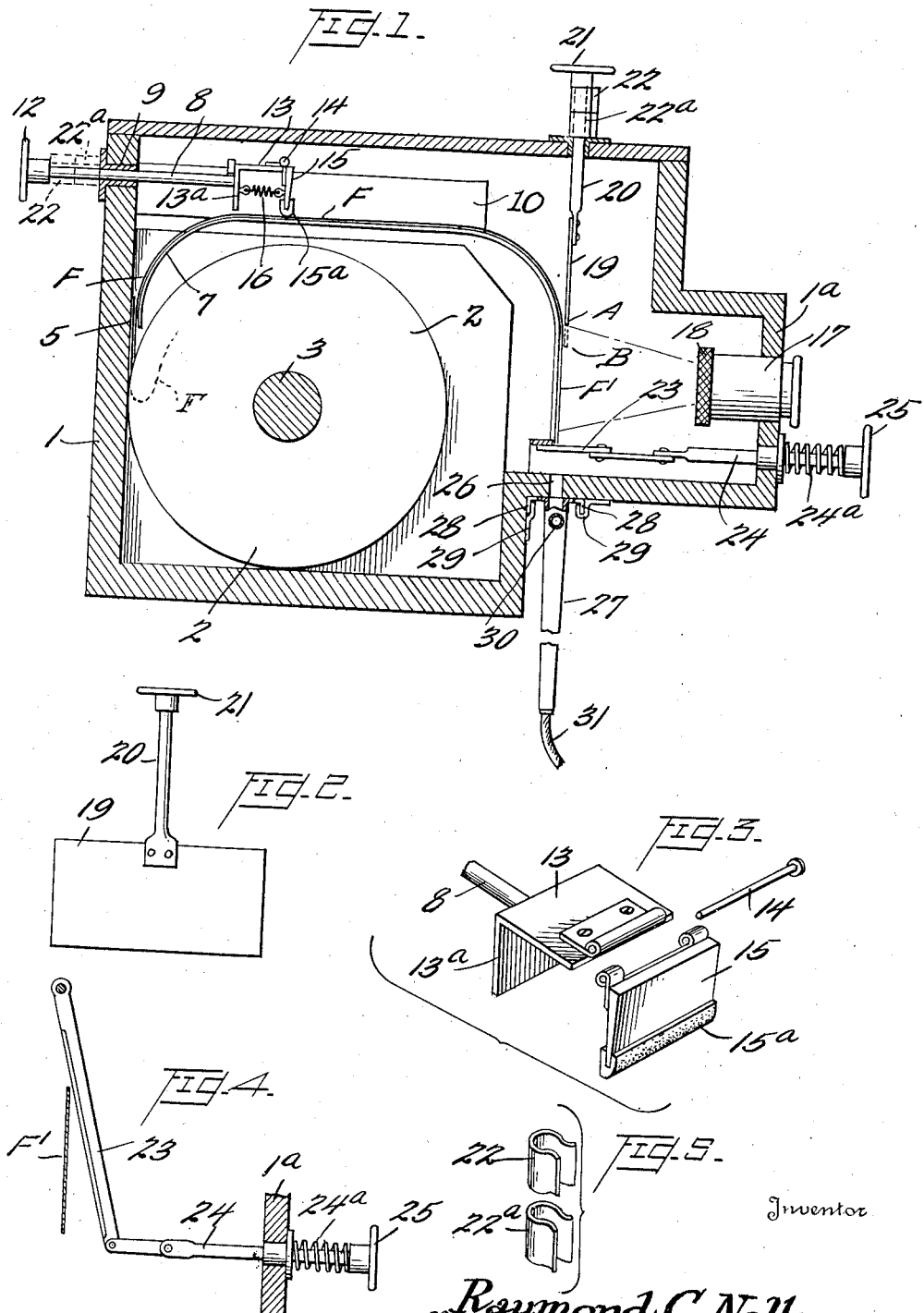

Patented Oct. 7, 1941

2,258,098

UNITED STATES PATENT OFFICE 2,258,098

CAMERA

Raymond C. Neltner, Newport, Ky.

Application April 23, 1941, Serial No. 389,983

4 Claims. (Cl. 95—34)

This invention relates to cameras, and especially to cameras of the commercial type, and has as an important object to provide a camera in which pictures of different sizes (that is, different lengths) may be produced upon the same strip of film without leaving any substantial unexposed portions of film between successive pictures such as would result in waste of the film. By the term "film" as used herein is meant the transparent strips coated with a light-sensitive emulsion from which conventional negatives are produced, as well as the so-called direct-positive papers suitably treated for the development of positive photographs directly thereon.

More particularly the invention has as an object to provide in a camera of the above character a screen adjustable to variable positions for exposing areas of different size upon the film strip to the field of the lens, means for feeding the film strip into and out of the field of the lens, and stops adapted to cooperate with the screen-adjusting means and the film-feeding means for correlating the distance of feed of the film to the length of film exposed. In the preferred form of my invention these stops are so constructed and arranged as to be interchangeably associated with the screen-adjusting means and the film-feeding means in a manner such as to require only a simple manual operation on the part of the operator entirely mechanical in character when changing over from one size of picture to another.

Another object of my invention is to provide in a camera of the above character screen-adjusting means extending to a position exteriorly of the camera so as to avoid the necessity of admitting light to the film housing when changing the adjustment of the screen.

Still another object of my invention is to provide in a camera of the above character, means for unwinding the film from a roll in a manner such as to tend to straighten the film out and reduce its bow or bend prior to its advancement into exposed position within the field of the lens.

A further object of my invention is to provide a developing camera including a developing tank arranged to receive a severed section of the exposed film strip, the arrangement being such that the initial developing solution is discharged against the strip, which tends to cling to the upper end of the tank, so as to effectively rinse the emulsion-coated face of the strip and flush the strip into the lower end of the tank.

Other objects and advantages will be apparent from the following detailed description of a preferred embodiment of the invention; reference being had to the annexed drawing in which:

Figure 1 is an upright cross-sectional view through one side of a camera;

Figure 2 is a detail view of the screen;

Figure 3 is a detail disassembled view of the film-feeding mechanism;

Figure 4 is a detail view of the knife for cutting off an exposed section of the film strip; and Figure 5 is a detail view of a pair of spacer clips.

Referring to the camera illustrated in Fig. 1, a light-tight housing I contains a film magazine 2, adapted to be loaded into the housing through one side thereof which is suitably hinged for this purpose. The roll of film F within the magazine is supported upon a rotatable shaft 3, and an end of the film extends out through a slot circumferentially provided in the magazine. This film is directed upwardly over a lip 5 leading off from an edge of the slot.

The film strip passes over the lower end of a trackway 7 arching upwardly in a direction toward the top of the housing. This trackway extends horizontally for a portion of its length and then curves downwardly in a vertical direction adjacent the forward end of the housing, as shown in the drawing. The film is adapted to be fed along the trackway by means of a push-rod 8 passing through an opening in the rear wall of the housing and lying parallel to the horizontal portion of the trackway. The push-rod inside the housing is supported on a cross-bar 9 guided for straight-line reciprocation upon the upper edge of a pair of blocks 10 (one only being shown) secured to the inner side faces of the housing. The external end of the push-rod is provided with a button 12 for pressing the push-rod inwardly.

The end of the push-rod located within the housing is secured to the down-turned end 13a of a horizontally-disposed feed plate 13 overlying the trackway. Upon the end of this feed plate opposite to its down-turned end is pivotally mounted on a pin 14 presser foot 15 adapted to swing toward and from the film strip supported on the trackway. A tension spring 16 has its ends connected to the downturned end 13a of the feed plate and to the presser foot 15, so as to yieldingly maintain the latter in gripping engagement with the film strip. A soft rubber shoe 15a is mounted upon the lower film-engaging edge of the presser foot, the arrangement being such that when the push-rod is pressed forwardly (i. e., inwardly) the presser foot rocks the shoe into clamping engagement with the film strip, and advances the latter along the trackway.

Slidably mounted in the vertical wall of an extended section 1a of the housing is a cylindrical lens holder 17 containing a lens (not shown) which, when the shutter contained in lens box 18 is operated, momentarily uncovers the lens to expose the film in a manner well-known in the photographic art. The field of the lens is indicated in dotted lines in Fig. 1. A rectangular-shaped screen 19, colored black, is fastened to the lower end of a rod 20 extending upwardly through the housing, and provided on its upper end with a button 21. This rod is adjustable upwardly and downwardly so that the screen may be positioned clear of the field of the lens to produce a full size picture, or so as to intercept a portion of this field for the production of pictures of reduced sizes.

For positioning the screen a plurality of cylindrical stops 22 and 22a are provided, these stops being longitudinally split and adapted to be laterally sprung over the rod 20 so as to encircle the rod between the button 21 and the top of the housing and hold the rod in elevated position. The push-rod 8 is of substantially the same diameter as the screen-adjusting rod 20, and consequently these stops may be alternatively assembled with the push-rod in the same manner so as to lie between the button 12 and the rear wall of the housing to limit the inward movement of the push-rod.

To conserve film, the size of the picture exposed to the field of the lens should approximately equal the length of the film strip advanced along the trackway past the field of the lens on each operation of the push-rod; that is, the feed of the film should be regulated to correspond to the size of the pictures to be taken. To accomplish this, the film feed and screen adjustment are correlated in the following manner: When both stops 22 and 22a are assembled on the screen-adjusting rod, the screen is supported with its lower edge at A just out of intercepting position with reference to the field of the lens, and the distance of feed of the film by the push-rod under push conditions corresponds to the maximum exposure of film. When one of the stops is removed from the rod 20 and assembled on the push-rod 8, as indicated in dotted lines, the screen 19 is lowered to the position designated B to reduce the size of the film exposure by one-quarter of its former length, while at the same time the interchanged stop limits the distance of feed of the film by a like amount. To further reduce the size of the picture, the other stop 22a may be switched from the screen-adjusting rod to the push-rod, which permits the screen to be lowered to its maximum extent, causing approximately one-half the original picture length of the film to be exposed; while the stop 22a in conjunction with the stop 22 already assembled on the push-rod, limits the feed of the film strip to one-half its normal distance, or to a distance corresponding to the size of the exposure determined by the new position of the screen.

Of course, the stops need not be confined to two in number, nor need they be of equal length. By increasing the number of stops and making them of comparatively short length, a wide variety of picture sizes is possible. Also, it will be apparent that by simply interchanging the stops from one rod to the other, any likelihood of mistake in altering the feed to correspond with the new setting of the screen is avoided. The operation is entirely mechanical in nature and requires no precise adjustments or mental calculation on the part of the operator such as are tedious and time-consuming.

Immediately below the field of the lens arranged cross-wise of the trackway is a pivoted knife 23 operable by a plunger 24 connected at one end to the free end of the knife, and having its other end projecting exteriorly through the front wall of the lens compartment 1a. A coil spring 24a encircling the plunger and lying between the housing and a button 25 on the outer end of the plunger maintains the knife normally in open position so that an exposed section of a film strip may be fed downwardly beneath the pivoted knife. By depressing the plunger, the exposed section of the film strip is clipped off by the knife, and this section drops down through a slot 26 in the bottom of the housing 1 located in line with the end of trackway 7.

Detachably connected to the bottom of the housing in line with slot 26 is a developing tank 27. This tank is of a width somewhat exceeding the width of the film strip, and is comparatively narrow in transverse thickness, tapering inwardly from its top toward its bottom. The upper end of the tank is provided with outturned flanges 28 which engage slideways 29, the arrangement being such that the tank may be slid laterally into and out of engagement with the slideways to attach the tank to and disconnect it from the housing. An inlet tube 30 leads through the wall adjacent the upper end of the tank and an outlet tube 31 leads off from the bottom of the tank, these tubes being intended for the introduction and removal of developing and fixing solutions and water rinses.

The film strip in its passage along the trackway 7 is bent in a direction opposite from its winding (indicated in dotted lines in Fig. 1) upon the roll contained in the magazine 2, and hence the tendency is to flatten out the film strip prior to its passage into the field of the lens. However, the curl or bow of the film is not entirely removed from the film strip, and consequently when an exposed section of the strip is severed, it will ordinarily cling to the upper end of the tank due to its curvature. But when the initial developing solution is directed upon its face, this solution will flush the film strip down into the bottom of the tank.

With direct positive paper, eight developing and fixing operations will usually be required, namely four chemical treatments alternating with four water rinses. Furthermore, by flooding the sensitized surface of the paper with the initial chemical solution while the exposed paper clings to the upper end of the tank, improved results are obtained. This appears to be due to the fact that the application of the initial chemical is practically simultaneous over the entire surface of the film which is not the case when the film is allowed to slowly sink in a bath of the solution, as in prior practice.

The upper end of inlet tube 30 may be provided with a funnel (not shown) by which the solutions and rinses may be conveniently introduced into the tube, and the lower end of outlet tube 31 may lead to a suitable collection receptacle for the recovery of the liquids. After the fixing solution has been applied to the film, the tank may be detached from the housing and the developed film strip removed.

By reason of the camera construction described above, it will be apparent that photographs may be taken in different sizes upon the same roll of film and without unnecessary waste of film, the only operation involved in changing over from one size of picture to another being a simple transposition of the stops 22 and 22a. It is not necessary that direct positive paper be used for the film strip, but the usual transparent films for the production of negatives may be employed if desired.

Various conventional parts of the camera have been omitted from the drawing in the interest of greater clearness since it is believed that such parts are unnecessary to an understanding of my invention.

Manifestly the invention may be embodied in forms other than that described above, which is to be regarded as exemplary rather than as restrictive of the invention, without departing from the spirit of my invention.

I claim:

1. A camera for taking different size pictures upon the same film strip, comprising a film housing, means for supporting a strip of film within said housing, a focusing lens extending through a wall of said housing, adjustable means for feeding the film strip variable distances across the field of the lens at each operation, a shutter for covering and uncovering said lens to expose the film located within the field of the lens, a screen adjustable to different positions for intercepting and reducing the field of the lens, and spacer means adapted to be interchangeably associated with the screen and film-feeding means for equalizing the distance of film feed and the length of the lens field uncovered by the screen.

2. A camera for taking different size pictures upon the same film strip, comprising a film housing, means for supporting a roll of film within said housing, a focusing lens extending through a wall of said housing, a trackway for guiding said film strip from adjacent the film-roll supporting means to a position within the field of the lens, film-engaging means for feeding said film strip step-by-step along the trackway, a shutter for covering and uncovering said lens to expose the film located within the field of the lens, a screen adjustable to different positions for intercepting and reducing the field of the lens, a member for adjusting the position of the screen, said member being connected to the screen and extending exteriorly of the housing, a manually-engageable member extending exteriorly of the housing and movable to actuate the film-engaging means, and a spacer adapted to be interchangeably associated with said members for determining the position of the screen or for limiting the length of the feed step.

3. A camera for taking different size pictures upon the same film strip, comprising a film housing, means for supporting a roll of film within said housing, a focusing lens extending through a wall of said housing, a trackway for guiding said film strip from adjacent the film-roll supporting means to a position within the field of the lens, a presser foot for engaging said film strip, a push-rod operatively connected to said presser foot and extending exteriorly of the housing, said push-rod adapted to be manually actuated for moving said film strip along the trackway in a step-by-step manner, a shutter for covering and uncovering said lens to expose the film located within the field of the lens, a screen adjustable to different positions for intercepting and reducing the field of the lens, a rod for adjusting the position of the screen, said rod being connected to the screen and extending exteriorly of the housing, and a spacer adapted to be interchangeably associated with said screen-adjusting rod and said push-rod for determining the position of the screen and limiting the length of the feed step.

4. In a camera of the type including a lens and means for feeding a film strip step-by-step into the field of the lens, a screen adjustable to different positions for intercepting and reducing the field of the lens and a stop adapted to be interchangeably associated with the screen and the film-feeding means to correlate the length of the feeding step to the length of the lens field uncovered by the screen.

RAYMOND C. NELTNER.